United States Patent
Braley et al.

(10) Patent No.: US 12,422,925 B1
(45) Date of Patent: Sep. 23, 2025

(54) METHODS AND SYSTEMS FOR INTERACTING WITH DIGITAL OBJECTS USING A GAZE TRACKING-ENABLED HEADSET

(71) Applicant: HUAWEI TECHNOLOGIES CO., LTD., Shenzhen (CN)

(72) Inventors: Sean Brian Braley, Orillia (CA); Roeland Petrus Hubertus Vertegaal, Perth Road (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/647,667

(22) Filed: Apr. 26, 2024

(51) Int. Cl.
*G02B 27/01* (2006.01)
*G06F 3/01* (2006.01)
*G06F 3/0481* (2022.01)
*G06F 3/16* (2006.01)

(52) U.S. Cl.
CPC .............. *G06F 3/013* (2013.01); *G06F 3/016* (2013.01); *G06F 3/167* (2013.01)

(58) Field of Classification Search
None
See application file for complete search history.

(56) References Cited

U.S. PATENT DOCUMENTS

2014/0108979 A1* 4/2014 Davidson .............. G06F 3/0481 715/765
2021/0304509 A1* 9/2021 Berkebile .............. G06V 40/20
2022/0279052 A1* 9/2022 Amacker ................ H04L 67/60
2022/0326766 A1 10/2022 Spencer et al.

FOREIGN PATENT DOCUMENTS

CN 112242005 A 1/2021

OTHER PUBLICATIONS

International Search Report issued by the China National Intellectual Property Administration for Application No. PCT/CN2025/090843, Jul. 15, 2025, China.

* cited by examiner

*Primary Examiner* — Carl Adams
(74) *Attorney, Agent, or Firm* — Troutman Pepper Locke LLP; Tim Tingkang Xia, Esq.

(57) ABSTRACT

A method of interacting with digital objects in a database associated with physical objects in an external environment includes tracking, by a camera on the headset, a gaze of a user in the external environment. identifying a gaze condition in response to determining the gaze of the user is directed to a physical object of interest in the external environment for at least a predetermined dwell-time, receiving a user input associated with the headset, and activating a digital interaction in response to identifying the gaze condition and receiving the user input, wherein the digital interaction relates to the physical object of interest in the database. Systems for performing the method may include a head mounted frame including a headset camera and a microphone as well as a processing unit. A unit for communicating with other computing resources may also be included.

20 Claims, 4 Drawing Sheets

METHODS AND SYSTEMS FOR INTERACTING WITH DIGITAL OBJECTS USING A GAZE TRACKING-ENABLED HEADSET

TECHNICAL FIELD

The present disclosure pertains generally to methods and systems for controlling computing devices using gaze tracking and in particular to methods and systems for controlling computing devices using gaze tracking with a headset.

BACKGROUND

A person's eye movement may closely link to their attention, behavior, and cognition. Eye gaze estimation or eye tracking is a computer vision task that has received significant interest in recent years. Gaze estimation has been widely applied, especially within the field of human-computer interaction. Examples include gaze control for hands-free interaction, gaze control for augmenting manual interactions, user attention analysis, understanding human behavior, augmented/virtual reality rendering.

Associated methods may detect if a user is gazing at a particular region of interest, typically a distinct object, which may be suitable for vehicle related applications. Within the automotive field, gaze tracking may be used to detect driver alertness, wherein features of the driver that indicate alertness may be measured in addition to monitoring a gaze point of the user to determine the percentage of time spent outside of the main driving task.

Gaze interactions often use dwell-time as a secondary input as stimulus to a system. This is primarily due to an effect known as "Midas touch", which may make a system that is overly responsive. Oppositely, a system that uses too long of a dwell-time will appear unresponsive. As such, a dwell time close to the human response time, on the order of 200 ms, may be used.

Alternative approaches use some method for a "click" or trigger, such as blinking of the eye. This is generally inadvisable, as it involves closing the eye, a typically involuntary action. There remains a need for improved gaze interactions for controlling and interacting between physical and digital objects.

SUMMARY

In some embodiments disclosed herein, methods and systems for interacting with real-world objects in an augmented reality (AR) context, by means of gaze and secondary interaction, that do not require a display mechanism on a headset, and so are not limited by the technical problems of such headsets, such as cost, complexity, and/or the like.

In some embodiments disclosed herein, methods of interaction with digital objects, by means of physical proxy objects, enabled with an augmented reality headset that utilizes primarily auditory and/or vibrotactile output to "augment" the world for the user. Systems for these interactions do not have a display system itself, instead relying on those of existing user devices such as smartphones, tablets, personal computers, televisions, etc.

In a broad aspect of the present disclosure, a method for a device to interact with digital objects in a database associated with physical objects in an external environment comprises: tracking, by a camera on a headset, a gaze of a user in the external environment; identifying a first gaze condition in response to determining the gaze of the user is directed to a first physical object of interest in the external environment for at least a first predetermined dwell time; receiving a first user input associated with the headset; and activating a first digital interaction in response to identifying the first gaze condition and receiving the first user input, wherein the first digital interaction relates to the first physical object of interest in the database.

In some embodiments, the first user input is a first voice command from a microphone.

In some embodiments, the method further comprising creating a first digital object in the database, wherein the first digital object is associated with the first physical object of interest.

In some embodiments, the method further comprises: identifying a second gaze condition in response to determining the gaze of the user is directed to the first physical object of interest for at least a second predetermined dwell time; receiving a second user input associated with the headset, wherein the second user input is for modifying the first digital object; and modifying the first digital object in response to identifying the second gaze condition and receiving the second user input.

In some embodiments, the method further comprises: receiving a modifying instruction from a digital object management system; and modifying a digital object in the database.

In some embodiments, the first digital object is read only.

In some embodiments, the first user input is a first query input; and the first digital interaction is at least one of: a query of the presence of a digital object relating to the first physical object of interest, a query of information relating to a digital object relating to the first physical object of interest, and information about the first physical object of interest.

In some embodiments, the method further comprises: identifying a first detection condition in response to the first object of interest having a related digital object; and generating a user notification in response to identifying the first gaze condition and the first detection condition.

In some embodiments, the user notification is a vibrotactile.

In some embodiments, the user notification is an auditory.

In some embodiments, the user notification is one of light, light emitting diode (LED), LED array, and audio.

In some embodiments, the first user input is from a touch enabled secondary smart device.

In some embodiments, the first user input is a stored user input.

In some embodiments, the first digital interaction is in another database and the database is accessible by other devices.

In a broad aspect of the present disclosure, a system for interacting with digital objects in a database associated with physical objects in an external environment comprises: a head mounted frame comprising: a headset camera comprising a gaze tracker, the headset camera configured to: track a gaze of a user in the external environment, and identify a first gaze condition in response to determining the gaze of the user is directed to a first physical object of interest in the external environment for at least a first predetermined dwell time, and a microphone configured to receive a first user input; and a processing unit configured to: activate a first digital interaction in response to the identified first gaze condition and the received first user input, wherein the first digital interaction relates to the first physical object of interest in the database.

In some embodiments, the head mounted frame further comprises one or more of a vibrotactile module for generating vibrational output, a speaker, a LED, and an LED array.

In some embodiments, the head mounted frame and the processing unit is connected with one or more of: universal serial bus, Thunderbolt™, WiFi™, Bluetooth, and direct wireless.

In a broad aspect of the present disclosure, a head mounted frame interacting with digital objects in a database associated with physical objects in an external environment comprises: a camera configured to obtain images relating to a gaze of a user in the external environment; a microphone; and a processing structure configured to: track the gaze of a user from the images; identify a first gaze condition in response to determining the gaze of the user is directed to a first physical object of interest in the external environment for at least a first predetermined dwell time; receive a first voice input from the microphone; and activate a first digital interaction in response to identifying the first gaze condition and receiving the first voice input, wherein the first digital interaction relates to the first physical object of interest in the database.

In some embodiments, the frame further comprises one or more of a vibrotactile module configured to generate vibrational output, a speaker, a LED, and an LED array.

In some embodiments, the processing structure further comprises a communications subsystem for communicating with other computing systems.

BRIEF DESCRIPTION OF THE DRAWINGS

For a more complete understanding of the disclosure, reference is made to the following description and accompanying drawings, in which.

Throughout the appended drawings, like features are identified by like reference numerals.

DETAILED DESCRIPTION

Figure 1A:
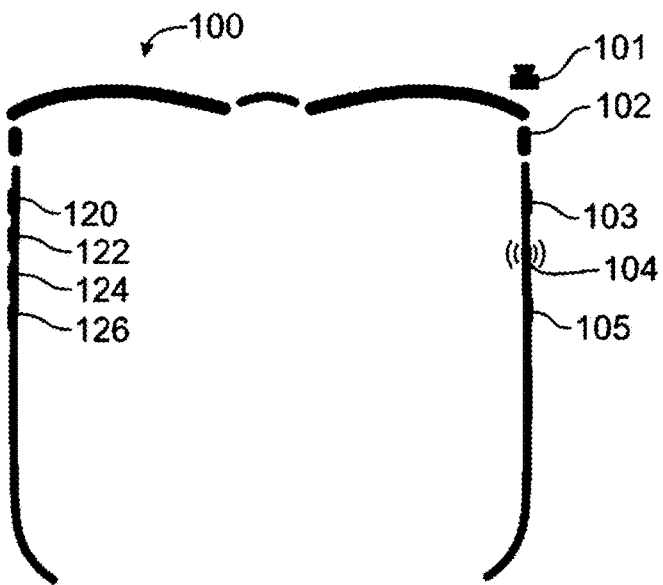
FIGS. 1A and 1B are schematic diagrams of an exemplary headset according to some embodiments disclosed herein.

Unless otherwise defined, all technical and scientific terms used herein generally have the same meaning as commonly understood by one of ordinary skill in the art to which this disclosure pertains. Exemplary terms are defined below for ease in understanding the subject matter of the present disclosure.

The term "a" or "an" refers to one or more of that entity; for example, "a module" refers to one or more modules or at least one module. As such, the terms "a" (or "an"), "one or more" and "at least one" are used interchangeably herein. In addition, reference to an element or feature by the indefinite article "a" or "an" does not exclude the possibility that more than one of the elements or features are present, unless the context clearly requires that there is one and only one of the elements. Furthermore, reference to a feature in the plurality (e.g., modules), unless clearly intended, does not mean that the modules or methods disclosed herein must comprise a plurality.

The expression "and/or" refers to and encompasses any and all possible combinations of one or more of the associated listed items (e.g. one or the other, or both), as well as the lack of combinations when interrupted in the alternative (or).

The term "to attend" or "attending" may be used herein to refer to eye tracking interactions for indicating that a user is looking at a particular device or a part of a device. For example, a user may be attending to a display.

The term "dwell-time" may refer to, the amount of time that the recorded gaze of a user spends within a specified region of interest and is typically user for triggering an event.

The term "digital object" may refer to any kind of file, web link, or database reference. Examples include pictures, URLs, and references to conversation.

A person's eye movement may be closely linked to their attention, behavior, and cognition. Eye gaze estimation or eye tracking may refer to a computer vision (CV) task. Gaze estimation may be used, especially within the field of human-computer interaction. Examples include gaze control for hands-free interaction, gaze control for augmenting manual interactions, user attention analysis, understanding human behavior, augmented/virtual reality (AR/VR) rendering.

Generally, gaze estimation may be used with reference to some frame, such as x-y coordinates on a smartphone or display. Alternatively, in the case of a head-mounted gaze tracker, this may be refer to an x-y coordinate relative to some world-facing camera view. In this case, the borders of a device may be detected and gaze projected within it. Some gaze estimation technologies may be accurate to approximately 1°.

Gaze interactions may use dwell-time as a secondary input as stimulus to the system. This is primarily due to an effect known as "Midas touch" but may result in a system that is overly responsive. Oppositely, a system that uses too long of a dwell-time may appear unresponsive. As such, a dwell time close to the human response time, on the order of 200 ms, may be used.

Alternative approaches may use some method for a click or trigger, such as blinking of the eye. This is generally inadvisable in a vehicle control use-case, as it involves closing the eye, a typically involuntary action.

As used herein, a "gaze condition" may refer to any condition associated with the gaze of a user that may be recognized or detected by a device, such as a headset and/or camera. The condition may be associated with the gaze of a user being detected to be on or about a feature, object of interest and/or the like in the surrounding environment. The condition may be further associated with the gaze being on the feature, object of interest and/or the like for a specified or predetermined period of time or dwell-time, such as in the order of about 200 ms.

Attentive user interfaces (AUIs) are interfaces that leverage the user's attention to facilitate interactions. They do this by sensing the user's attention, primarily through eye-fixations, and then reasoning about this attention. By determining the user's attention, devices may communicate this to other devices, and negotiate turn-taking. In building attentive user interfaces, gaze data may be utilized indirectly, allowing for an appreciable benefit to the user, without the issues caused by traditional, gaze-activated interactions.

Existing systems and methods may either use gaze tracking to enable interactions on some display, such as on a computer monitor or smartphone, or they use the display capabilities of an AR/VR headset to create a display on, and then allow for some eye tracking interactions.

In a first case, using a display technology of some kind, the scope of objects that may be interacted with is inherently limited (to these devices with displays). This resulting reduces the scope and effectiveness of the interactions. Additionally, in order to enable gaze tracking on multiple devices, multiple gaze trackers are often needed.

In a second case, existing AR interactions rely on expensive or limited resolution displays. VR, or video-pass-through AR require significant processing power and generally limit the user's ability to interact with others.

In some embodiments of the present disclosure, methods and systems are provided for interacting with real-world objects in an AR context, by means of gaze and a secondary interaction. These interactions may not require a display mechanism on the headset, and so are not limited by the technical problems of such headsets (for example, cost, complexity). These interactions may be referred to as digital interactions.

In some embodiments of the present disclosure, methods of interaction with digital objects (or digital interactions), by means of physical proxy objects, enabled with an augmented reality headset that utilizes primarily auditory and/or vibrotactile output to "augment" the world for the user. Embodiments of systems disclosed herein may not have a display system itself, instead relying on those of existing user devices such as smartphones, tablets, personal computers, televisions, etc.

Embodiments of methods and systems disclosed herein may relate to interaction techniques for controlling a system, including: method(s) of affixing/removing digital objects to physical objects by means of the headset only, method(s) of doing the above with a secondary smart device such as a smartphone, method(s) for indicating to the user that a digital object is attached to a gazed-at physical object and/or that the object is available for interaction, and method(s) for sharing digital objects on common physical objects between multiple users.

Figure 1B:
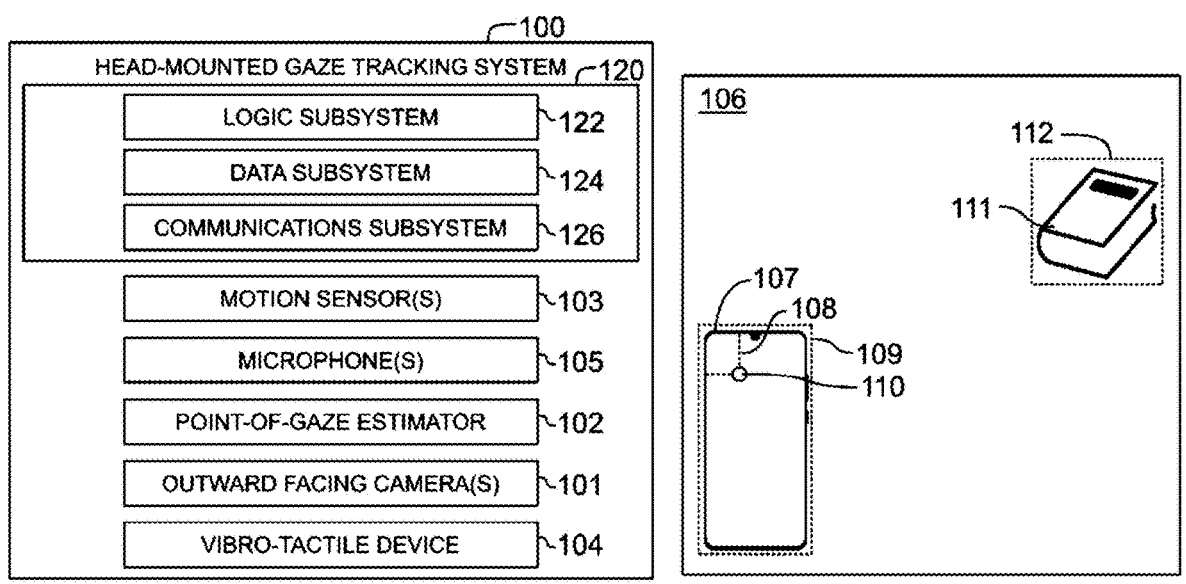

Referring to FIGS. 1A and 1B, in some embodiments of the present disclosure, a head-mounted gaze tracker 100 comprises a scene camera 101, which may output a 2D point-of-gaze 110 in the frame of reference 106 of the scene camera. This headset 100 may further comprise at least one of a vibro-tactile generator or speaker 104 or a means to connect to earphones or earbuds, either wired or wirelessly connected thereto. The headset 100 may further comprise a microphone 102 or use a wired or wireless connection to connect to headphones or earbuds that have this capability. The headset 100 may further comprise an inertial measurement unit (IMU) sensor 103 and a tap sensor 105, or have a tap-recognition algorithm running on or based on readings from the IMU.

The headset 100 may comprise a head-mounted gaze tracking system 120, which may comprise a logic subsystem 122, a data subsystem 124, and/or a communications subsystem 126. Calibration of the gaze tracking system 120 may be slippage-free so as to only require infrequency calibration.

The gaze tracking system 120 may use an object-detection system to identify primarily: objects 111 and bounds 112 for that object that the user may choose to interact with, such as books, plants, pictures, and/or the like, and secondarily: smart devices 107 and bounds 109 of those devices as well as the delta between the device boundary and gaze 109 on devices such as phones, laptops, tablets, and/or the like.

Figure 2:
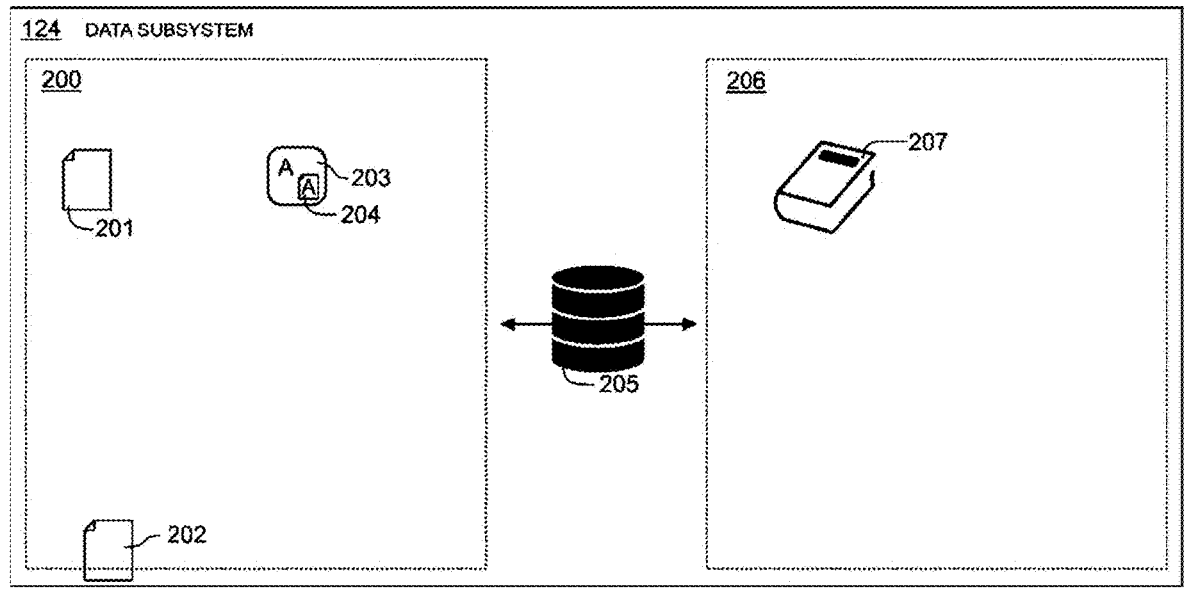
FIG. 2 is a schematic diagram of a data subsystem according to some embodiments disclosed herein.

Referring to FIG. 2, a data subsystem 124 of a gaze tracking system 120 may comprise digital objects 201, which may include: user generated content, such as pictures, text, audio or video files, data files, and/or the like; application generated content 204 such as applications or apps 203, notifications from applications, links to specific pages within applications; generic linking such as through web links or RSS feeds; filters on data sources such as messages from a certain contact, shortcut or command sequences that execute a program, and external content 202.

In some embodiments, digital objects may be attached through user created rules or applications. For example, a user may define an association between a physical calendar and a digital calendar, wherein events in the physical calendar will be synchronized in the digital calendar when a user looks at the physical calendar. In another example, an application for plant management may generate watering reminders for houseplants based on a specified schedules and digital objects may be added for association with the houseplants for tracking watering.

In some embodiments, external content or event may trigger a digital object based on predefined rules. For example, an association may be made between a picture and a contact, wherein when a text message is received from that contact, a digital object relating to the text message is attached to the picture. In another example, an association may be made between receiving e-mails and an physical object on a desk, wherein when e-mails are received, digital objects are attached to the physical object.

The data subsystem 124 may maintain a database 205, comprising information linking a collection of digital objects 200 with a collection of physical objects 206, which are either specific or classes of physical object 207.

Figure 3:
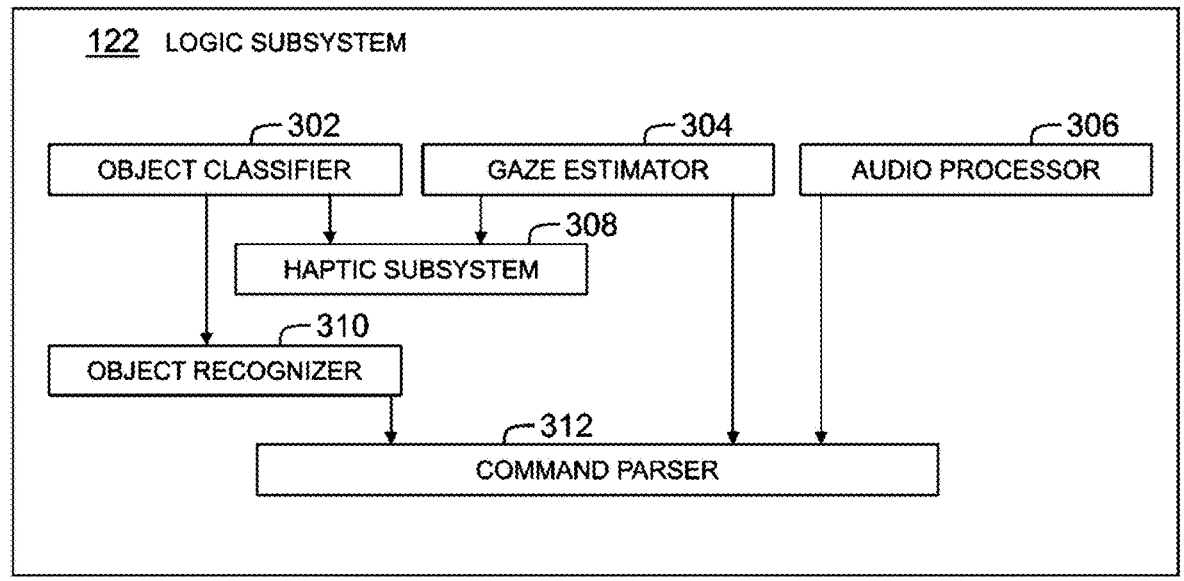
FIG. 3 is a schematic diagram of a logic subsystem according to some embodiments disclosed herein.

Referring to FIG. 3, the user may have the ability to interact with objects in the world by means of the logic subsystem 122. This may include an object classifier 302 that identifies objects in the scene camera's view 101, e.g. a book. This may connect to the haptic subsystem 308 directly as outlined in the embodiments. A object recognizer 310 may be for remembering specific objects, and is connected to the data subsystem 124. An audio processor 306 may listen for audio (e.g. commands, instructions and/or the like) from the user and passes it to the command parser 312. The command parser may then use the assembled information to determine a correct command sequence to execute.

Embodiments disclosed herein may comprise augmented reality glasses, that do not utilize a display. However, methods and systems disclosed herein may be used with a device that has a display. Methods and systems disclosed herein may interact with a variety of devices such as smartphones, tablets, televisions, laptops, smart speakers, internet of things (IoT) devices, and/or the like.

Embodiments of methods and systems disclosed herein may comprise a head-mounted frame, in the form of glasses, sunglasses and/or the like. A camera with a viewpoint similar to the wearer's field of view may be mounted on the frame, the camera may be referred to as a scene camera 101. Methods and systems may further comprise a gaze tracker 102 capable of calculating the users' point-of-gaze relative to the scene camera, a motion sensor 103, a microphone 105 capable of detecting the user's voice, a speaker or wired connection to headphones or earbuds or a wireless connection to wireless headphones or earbuds or bone-conducting audio capable of reproducing sounds to the user, and either a vibrotactile generator 104 capable of creating haptic sensations for the user located on the headset or on a secondary device such as a smartwatch or smartphone, activated by means of digital or analog, wired or wireless communication or an audio source device or connection to the user's audio source device (for example, wired or wireless earbuds or headphones) capable of notifying the user.

A computing system running on either the headset, or a secondary computing device located on or near the user via a wired or wireless connection or on a remote computing device such as the cloud that performs the computing functions described herein. In some embodiments, a portion of the processing may occur "on-device" with another portion occurring on a remote computing platform.

In embodiments of methods and systems disclosed herein, a user may perform voice-based interactions on a set of digital and physical objects that are associated with one another, both in physical space and a database system. These voice commands may be interpreted with context of a gazed-at object, and allow the user to interact with physical and digital objects without an AR display.

In embodiments of methods and systems disclosed herein, digital objects may be affixed to physical objects where the user creates a new digital object while gazing at the physical object. The user may performs this action by speaking a voice command, which is detected by the microphone on the headset. For example, "create a reminder . . . "

In embodiments of methods and systems disclosed herein, modifying digital objects that are associated with physical ones may be performed by gazing at the physical object and providing a user input. The user input may in the form of a button, switch, knob and/or the like or may comprise speaking a voice command such as "change this reminder . . . ", "remove this reminder . . . ", and/or the like.

In embodiments of methods and systems disclosed herein, digital objects may be added to or removed from physical objects by the system, configured by the end user. Example, the user may configure a physical calendar to act as a proxy to a digital one—where an appointment may exist as a digital object available for interaction on that physical calendar.

In embodiments of methods and systems disclosed herein, read-only digital objects may be affixed to fixed physical objects or locations such that users may consume, but not change or remove the digital object. For example, in an art gallery, each physical painting may have a digital object with information about the creator.

In embodiments of methods and systems disclosed herein, physical objects may be physically queried, regardless of whether they have a digital object attached. In such an interaction, a user may query the presence of digital objects, information about those digital objects, or information about the detected physical object itself.

In embodiments of methods and systems disclosed herein, a system may notify the presence of a digital object on a physical one by activating the vibrotactile system as the user's gaze crosses the detected object boundary. The strength and relative frequency of the vibrotactile notification may be configurable by the end user. Further, the system may optionally define a period of time during which glances away from the object will not trigger this action. In some embodiments, an auditory notification may be used in place or in conjunction with the vibrotactile feedback.

In embodiments of methods and systems disclosed herein, a user may add digital objects from a touch-enabled secondary smart device by means of a swipe gesture, while looking at the target objects. Digital objects on said secondary smart device may be selected by means of a long-press gesture, other mechanisms such as a share-button, and/or the like.

In embodiments of methods and systems disclosed herein, the system may learn, by means of a system of memory of repeated tasks, or some other model, a "most likely" or "common" interaction that a user performs with a physical object. As a result, a user may perform a shorter interaction, including but not limited to a head gesture (for example, a nod, a tap, a shake and/or the like), a tap interaction on the headset, a non-word short vocalization (for example, "ah", "uh", and/or the like), or a keyword command (for example, "activate", "go" and/or the like).

In embodiments of methods and systems disclosed herein, when the user is looking at a physical object that has some smart capabilities, but lacks a high-resolution display, for example a smart speaker, the device may notify the presence of digital objects by means of a light, LED, LED array, or audio.

In embodiments of methods and systems disclosed herein, two or more systems may utilize interactions to interact with shared digital objects on common physical objects, such that both multiple users may access them.

Embodiments disclosed herein may comprise computing systems running on a separate device from the user, such as on a smartphone or tablet. In such cases, data may be transmitted via a wired connection such as USB, Thunderbolt™, and/or the like. Alternatively, data may be transmitted via a wireless connection such as WiFi™, Bluetooth™, direct wireless, and/or the like.

Embodiments disclosed herein may comprise computing systems running on a remote device, such as a cloud computer. In such cases, data is transmitted from the headset via a WiFi™, a cellular connection and/or the like. Alternatively, data may be transmitted from the headset via a secondary device such as a smartphone or tablet, which has its own network connection, such as WiFi™, cellular, and/or the like.

Embodiments disclosed herein may also comprise a communications subsystem 126 for communicating, accessing, interfacing and/or the like with other computing systems, such as separate devices (e.g. smartphones or tablets) or remote devices (e.g. cloud computer) for providing or obtaining information, data and/or the like. As above, such communications, accesses, interfaces and/or the like may use wired connections (e.g. USB, Thunderbolt™, etc.) or wireless connections (e.g. WiFi™, Bluetooth™, direct wireless, cellular, etc.)

As used herein, a "device" is a term of explanation referring to a hardware structure such as a circuitry implemented using technologies such as electrical and/or optical technologies (and with more specific examples of semiconductors) for performing defined operations or processings. A "device" may alternatively refer to the combination of a hardware structure and a software structure, wherein the hardware structure may be implemented using technologies such as electrical and/or optical technologies (and with more specific examples of semiconductors) in a general manner for performing defined operations or processings according to the software structure in the form of a set of instructions stored in one or more non-transitory, computer-readable storage devices or media.

As used herein, the device may be a part of an apparatus, a system, and/or the like, wherein the device may be coupled to or integrated with other parts of the apparatus, or system such that the combination thereof forms the apparatus, or system.

The device executes a process for performing. Herein, a process has a general meaning equivalent to that of a method, and does not necessarily correspond to the concept of computing process (which is the instance of a computer program being executed). More specifically, a process herein is a defined method implemented using hardware components for process data. A process may comprise or use one or more functions for processing data as designed. Herein, a function is a defined sub-process or sub-method for computing, calculating, or otherwise processing input data in a defined manner and generating or otherwise producing output data.

As those skilled in the art will appreciate, the method disclosed herein may be implemented as one or more software and/or firmware programs having necessary computer-executable code or instructions and stored in one or more non-transitory computer-readable storage devices or media which may be any volatile and/or non-volatile, non-removable or removable storage devices such as RAM, ROM, EEPROM, solid-state memory devices, hard disks, CDs, DVDs, flash memory devices, and/or the like. The device may read the computer-executable code from the storage devices and execute the computer-executable code to perform the methods disclosed herein.

Alternatively, the methods disclosed herein may be implemented as one or more hardware structures having necessary electrical and/or optical components, circuits, logic gates, integrated circuit (IC) chips, and/or the like.

The devices may be computing devices that may be portable and/or non-portable computing devices such as laptop computers, tablets, smartphones, Personal Digital Assistants (PDAs), desktop computers, smart devices, and/or the like. Each computing device may execute one or more client application programs which sometimes may be called "apps".

Figure 4:
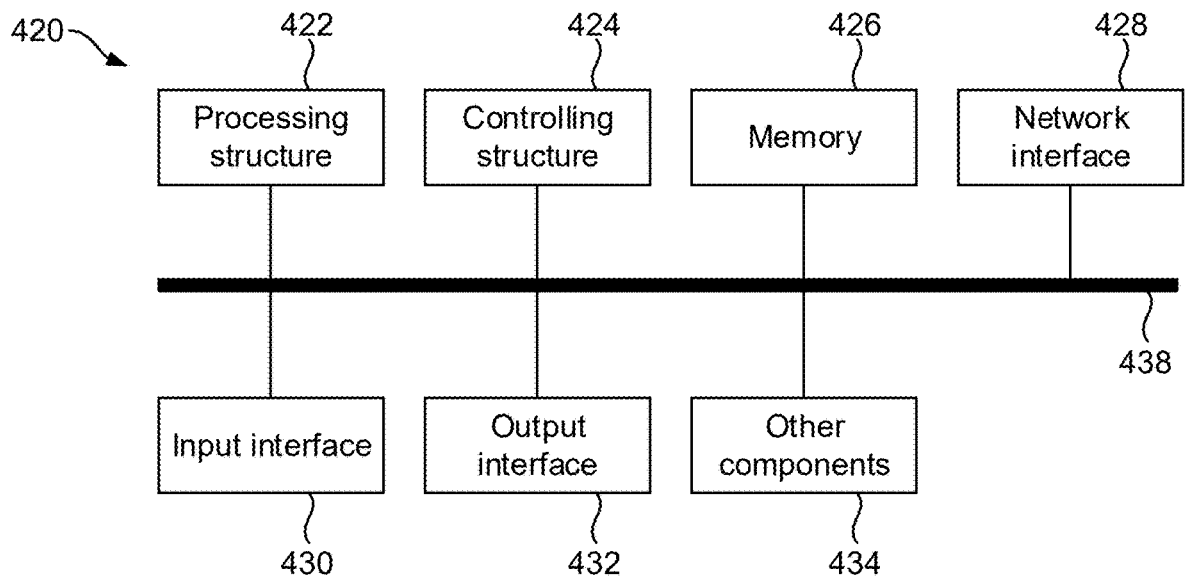
FIG. 4 is a schematic diagram showing a simplified hardware structure of a computing device.

Generally, the computing devices comprise similar hardware structures such as hardware structure 420 shown in FIG. 4. As shown, the hardware structure 420 comprises a processing unit or processing structure 422, a controlling structure 424, one or more non-transitory computer-readable memory or storage devices 426, a network interface 428, an input interface 430, and an output interface 432, functionally interconnected by a system bus 438. The hardware structure 420 may also comprise other components 434 coupled to the system bus 438.

The processing structure 422 may be one or more single-core or multiple-core computing processors, generally referred to as central processing units (CPUs). When the processing structure 422 comprises a plurality of processors, the processors thereof may collaborate via a specialized circuit such as a specialized bus or via the system bus 438.

The processing structure 422 may also comprise one or more real-time processors, programmable logic controllers (PLCs), microcontroller units (MCUs), u-controllers (UCs), specialized/customized processors, hardware accelerators, and/or controlling circuits (also denoted "controllers") using, for example, field-programmable gate array (FPGA) or application-specific integrated circuit (ASIC) technologies, and/or the like. In some embodiments, the processing structure includes a CPU (otherwise referred to as a host processor) and a specialized hardware accelerator which includes circuitry configured to perform computations of neural networks such as tensor multiplication, matrix multiplication, and the like. The host processor may offload some computations to the hardware accelerator to perform computation operations of neural network. Examples of a hardware accelerator include a graphics processing unit (GPU), Neural Processing Unit (NPU), and Tensor Process Unit (TPU). In some embodiments, the host processors and the hardware accelerators (such as the GPUs, NPUs, and/or TPUs) may be generally considered processors.

Generally, the processing structure 422 comprises necessary circuitry implemented using technologies such as electrical and/or optical hardware components for executing transformer related processes.

For example, the processing structure 422 may comprise logic gates implemented by semiconductors to perform various computations, calculations, and/or processings. Examples of logic gates include AND gate, OR gate, XOR (exclusive OR) gate, and NOT gate, each of which takes one or more inputs and generates or otherwise produces an output therefrom based on the logic implemented therein. For example, a NOT gate receives an input (for example, a high voltage, a state with electrical current, a state with an emitted light, or the like), inverts the input (for example, forming a low voltage, a state with no electrical current, a state with no light, or the like), and output the inverted input as the output.

While the inputs and outputs of the logic gates are generally physical signals and the logics or processings thereof are tangible operations with physical results (for example, outputs of physical signals), the inputs and outputs thereof are generally described using numerals (for example, numerals "0" and "1") and the operations thereof are generally described as "computing" (which is how the "computer" or "computing device" is named) or "calculation", or more generally, "processing", for generating or producing the outputs from the inputs thereof.

Sophisticated combinations of logic gates in the form of a circuitry of logic gates, such as the processing structure 422, may be formed using a plurality of AND, OR, XOR, and/or NOT gates. Such combinations of logic gates may be implemented using individual semiconductors, or more often be implemented as integrated circuits (ICs).

A circuitry of logic gates may be "hard-wired" circuitry which, once designed, may only perform the designed functions. In this example, the processes and functions thereof are "hard-coded" in the circuitry.

With the advance of technologies, it is often that a circuitry of logic gates such as the processing structure 422 may be alternatively designed in a general manner so that it may perform various processes and functions according to a set of "programmed" instructions implemented as firmware and/or software and stored in one or more non-transitory computer-readable storage devices or media. In this example, the circuitry of logic gates such as the processing structure 422 is usually of no use without meaningful firmware and/or software.

Of course, those skilled in the art will appreciate that a process or a function (and thus the processor) may be implemented using other technologies such as analog technologies.

Referring back to FIG. 4, the controlling structure 424 comprises one or more controlling circuits, such as graphic controllers, input/output chipsets and the like, for coordinating operations of various hardware components and modules of the computing device.

The memory 426 comprises one or more storage devices or media accessible by the processing structure 422 and the controlling structure 424 for reading and/or storing instructions for the processing structure 422 to execute, and for reading and/or storing data, including input data and data generated by the processing structure 422 and the controlling structure 424. The memory 426 may be volatile and/or non-volatile, non-removable or removable memory such as RAM, ROM, EEPROM, solid-state memory, hard disks, CD, DVD, flash memory, or the like.

The input interface 430 comprises one or more input modules for one or more users to input data via, for example, touch-sensitive screen, touch-sensitive whiteboard, touch-pad, keyboards, computer mouse, trackball, microphone, scanners, cameras, and/or the like. The input interface 430 may be a physically integrated part of the computing device (for example, the touch-pad of a laptop computer or the touch-sensitive screen of a tablet), or may be a device physically separate from, but functionally coupled to, other components of the computing device (for example, a computer mouse). The input interface 430, in some implementation, may be integrated with a display output to form a touch-sensitive screen or touch-sensitive whiteboard.

The output interface 432 comprises one or more output modules for output data to a user. Examples of the output modules comprise displays (such as monitors, LCD displays, LED displays, projectors, and the like), speakers, printers, virtual reality (VR) headsets, augmented reality (AR) goggles, and/or the like. The output interface 432 may be a physically integrated part of the computing device (for example, the display of a laptop computer or tablet), or may be a device physically separate from but functionally coupled to other components of the computing device (for example, the monitor of a desktop computer).

The system bus 438 interconnects various components 422 to 434 enabling them to transmit and receive data and control signals to and from each other.

Figure 5:
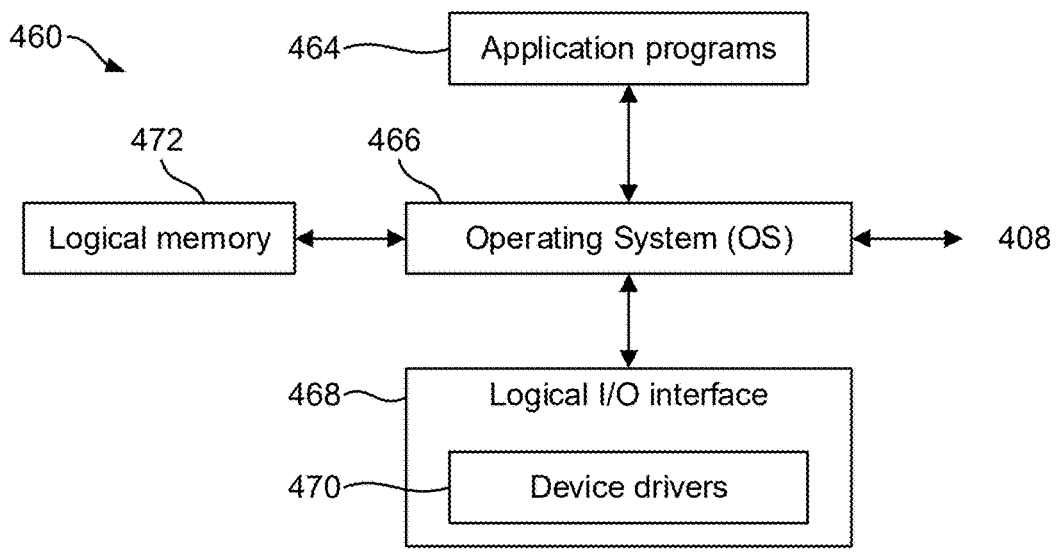
FIG. 5 is a schematic diagram showing a simplified software architecture of a computing device.

FIG. 5 shows a simplified software architecture 460 of the computing device. The software architecture 460 comprises one or more application programs 464, an operating system 466, a logical input/output (I/O) interface 468, and a logical memory 472. The one or more application programs 464, operating system 466, and logical I/O interface 468 are generally implemented as computer-executable instructions or code in the form of software programs or firmware programs stored in the logical memory 472 which may be executed by the processing structure 422.

The one or more application programs 464 executed by or run by the processing structure 422 for performing various tasks such as the methods disclosed herein.

The operating system 466 manages various hardware components of the computing device 402 or 404 via the logical I/O interface 468, manages the logical memory 472, and manages and supports the application programs 464. The operating system 466 is also in communication with other computing devices (not shown) via the network 408 to allow application programs 464 to communicate with those running on other computing devices. As those skilled in the art will appreciate, the operating system 466 may be any suitable operating system. The computing devices may all have the same operating system, or may have different operating systems.

The logical I/O interface 468 comprises one or more device drivers 470 for communicating with respective input and output interfaces 430 and 432 for receiving data therefrom and sending data thereto. Received data may be sent to the one or more application programs 464 for being processed by one or more application programs 464. Data generated by the application programs 464 may be sent to the logical I/O interface 468 for outputting to various output devices (via the output interface 432).

The logical memory 472 is a logical mapping of the physical memory 426 for facilitating the application programs 464 to access. In this embodiment, the logical memory 472 comprises a storage memory area that may be mapped to a non-volatile physical memory such as hard disks, solid-state disks, flash drives, and the like, generally for long-term data storage therein. The logical memory 472 also comprises a working memory area that is generally mapped to high-speed, and in some implementations volatile, physical memory such as RAM, generally for application programs 464 to temporarily store data during program execution. For example, an application program 464 may load data from the storage memory area into the working memory area, and may store data generated during its execution into the working memory area. The application program 464 may also store some data into the storage memory area as required or in response to a user's command.

Figure 6:
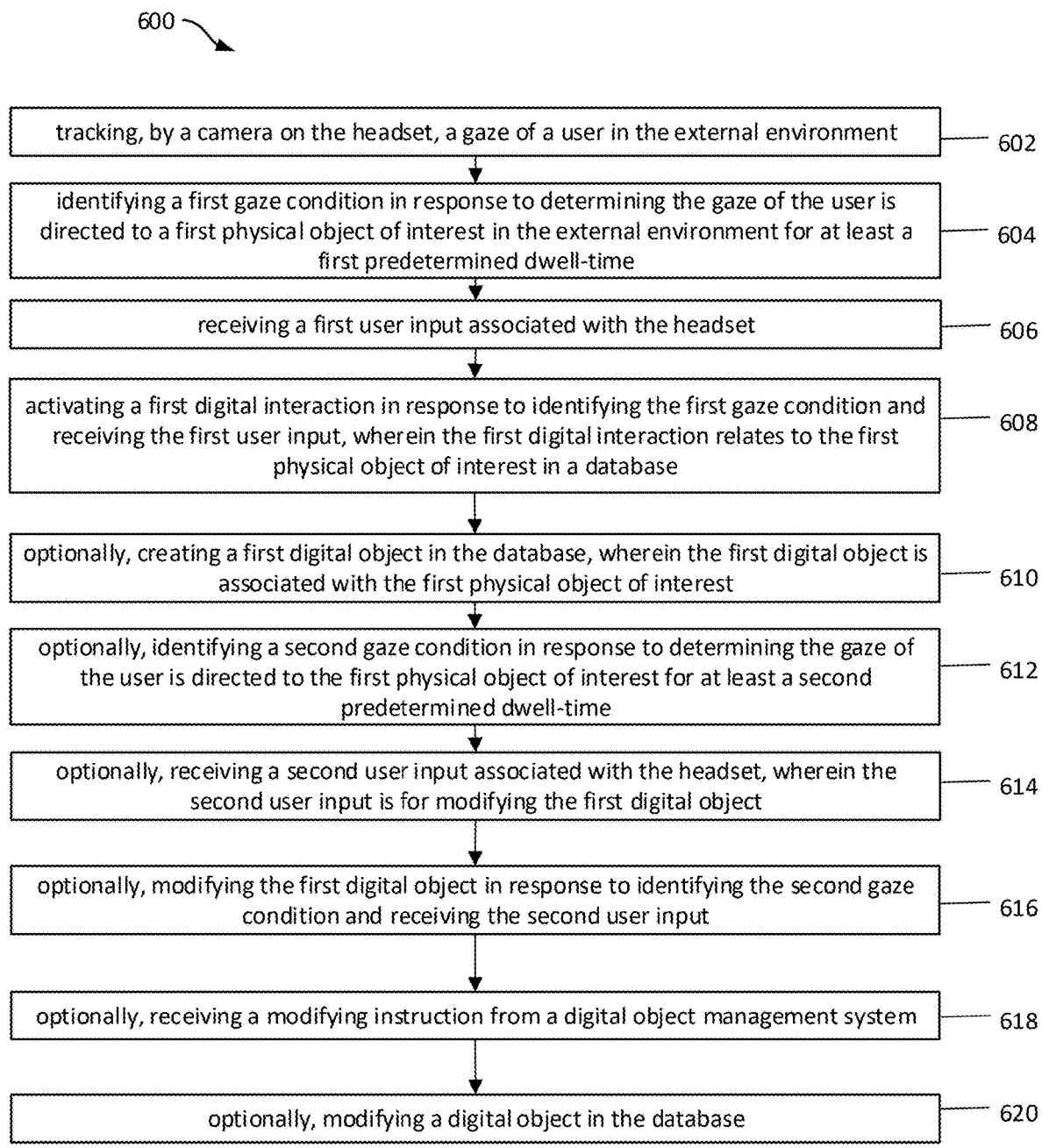
FIG. 6 is a flowchart illustrating a method according to embodiments of the present disclosure.

FIG. 6 is a flowchart showing the steps of a method 600, according to some embodiments of the present disclosure. The method 600 begins with tracking, by a camera on the headset, a gaze of a user in the external environment (step 602). At step 604, the method comprises identifying a first gaze condition in response to determining the gaze of the user is directed to a first physical object of interest in the external environment for at least a first predetermined dwell-time. At step 606, the method comprises receiving a first user input associated with the headset. At step 608, the method comprises activating a first digital interaction in response to identifying the first gaze condition and receiving the first user input, wherein the first digital interaction relates to the first physical object of interest in a database. At step 610, optionally, the method comprises creating a first digital object in the database, wherein the first digital object is associated with the first physical object of interest. At step 612, optionally, the method comprises identifying a second gaze condition in response to determining the gaze of the user is directed to the first physical object of interest for at least a second predetermined dwell-time. At step 614, optionally, the method comprises receiving a second user input associated with the headset, wherein the second user input is for modifying the first digital object. At step 616, optionally, the method comprises modifying the first digital object in response to identifying the second gaze condition and receiving the second user input. At step 618, optionally, the method comprises receiving a modifying instruction from a digital object management system. At step 620, optionally, the method comprises modifying a digital object in the database.

Embodiments have been described above in conjunctions with aspects of the present invention upon which they may be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations may be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for a device to interact with digital objects in a database associated with physical objects in an external environment, the method comprising:
   tracking, by a camera on a headset, a gaze of a user in the external environment;
   identifying a first gaze condition in response to determining the gaze of the user is directed to a first physical object of interest in the external environment for at least a first predetermined dwell time;
   receiving a first user input associated with the headset;
   activating a first digital interaction in response to said identifying the first gaze condition and said receiving the first user input, wherein the first digital interaction relates to the first physical object of interest;
   creating a first digital object in the database, wherein the first digital object is associated with the first physical object of interest;
   identifying a second gaze condition in response to determining the gaze of the user is directed to the first physical object of interest for at least a second predetermined dwell time;
   receiving a second user input associated with the headset, wherein the second user input is for modifying the first digital object; and
   modifying the first digital object in response to identifying the second gaze condition and receiving the second user input.

2. The method of claim 1, wherein the first user input is a first voice command from a microphone and/or the second user input is a second voice command from the microphone.

3. The method of claim 1, further comprising:
   receiving a modifying instruction from a digital object management system; and
   modifying a digital object in the database.

4. The method of claim 1, wherein the first digital object is read only.

5. The method of claim 1,
   wherein the first user input is a first query input; and
   wherein the first digital interaction is at least one of:
      a query of the presence of a digital object relating to the first physical object of interest,
      a query of information relating to a digital object relating to the first physical object of interest, and
      information about the first physical object of interest.

6. The method of claim 1, further comprising:
   identifying a first detection condition in response to the first object of interest having a related digital object; and
   generating a user notification in response to identifying the first gaze condition and the first detection condition.

7. The method of claim 6, wherein the user notification is a vibrotactile.

8. The method of claim 6, wherein the user notification is an auditory.

9. The method of claim 6, wherein the user notification is one of light, light emitting diode (LED), LED array, and audio.

10. The method of claim 1, wherein at least one of the first user input or the second user input is from a touch enabled secondary smart device associated with the headset.

11. The method of claim 10, wherein the first user input includes a selection of a digital object displayed on the secondary smart device and associated with the first digital object.

12. The method of claim 1, wherein the first user input is a stored user input.

13. The method of claim 1, wherein the first digital interaction is in another database and the database is accessible by other devices.

14. One or more non-transitory computer-readable storage media comprising computer-executable instructions, wherein the instructions, when executed, cause a processing structure to perform the method of claim 1.

15. A system for interacting with digital objects in a database associated with physical objects in an external environment, the system comprising:
   a head mounted frame comprising:
      a headset camera comprising a gaze tracker;
      a microphone configured to receive a first user input; and
      a processing unit coupled to the frame and configured to control the headset camera and the microphone to:
         track a gaze of a user in the external environment;
         identify a first gaze condition in response to determining the gaze of the user is directed to a first physical object of interest in the external environment for at least a first predetermined dwell time;
         receive a first user input;
         activate a first digital interaction in response to the identified first gaze condition and the received first user input, wherein the first digital interaction relates to the first physical object of interest;
         create a first digital object in the database, wherein the first digital object is associated with the first physical object of interest;
         identify a second gaze condition in response to determining the gaze of the user is directed to the first physical object of interest for at least a second predetermined dwell time;
         receive a second user input associated with the headset, wherein the second user input is for modifying the first digital object; and
         modify the first digital object in response to identifying the second gaze condition and receiving the second user input.

16. The system of claim 15, wherein the head mounted frame further comprises one or more of a vibrotactile module for generating vibrational output, a speaker, a LED, and an LED array.

17. The system of claim 15, wherein the head mounted frame and the processing unit are coupled with one or more of: universal serial bus, Thunderbolt™, WiFi™, Bluetooth, and direct wireless.

18. A head mounted frame interacting with digital objects in a database associated with physical objects in an external environment, the frame comprising:
   a camera configured to obtain images relating to a gaze of a user in the external environment;
   a microphone; and
   a processing structure configured to:
      track the gaze of a user from the images;
      identify a first gaze condition in response to determining the gaze of the user is directed to a first physical object of interest in the external environment for at least a first predetermined dwell time;
      receive a first voice input from the microphone; and
      activate a first digital interaction in response to identifying the first gaze condition and receiving the first voice input, wherein the first digital interaction relates to the first physical object of interest;
      create a first digital object in the database, wherein the first digital object is associated with the first physical object of interest; and identify a second gaze condition in response to determining the gaze of the user is directed to the first physical object of interest for at least a second predetermined dwell time;

receive a second user input associated with the headset, wherein the second user input is for modifying the first digital object; and modify the first digital object in response to identifying the second gaze condition and receiving the second user input.

19. The frame of claim 18 further comprising one or more of a vibrotactile module configured to generate vibrational output, a speaker, an LED, and an LED array.

20. The frame of claim 18, wherein the processing structure further comprises a communications subsystem for communicating with other computing systems.

* * * * *